No. 11,863. Reissued Oct. 9, 1900.

J. MEANEY & J. STOEVER.

TRUCK.

(Application filed May 15, 1900.)

WITNESSES:

William P. Goebel.

E. L. Owens.

INVENTORS.

John Meaney.

John Stoever.

BY

ATTORNEYS

UNITED STATES PATENT OFFICE.

JOHN MEANEY AND JOHN STOEVER, OF RIDGEFIELD PARK, NEW JERSEY; SAID STOEVER ASSIGNOR TO SAID MEANEY.

TRUCK.

SPECIFICATION forming part of Reissued Letters Patent No. 11,863, dated October 9, 1900.

Original No. 634,532, dated October 10, 1899. Application for reissue filed May 15, 1900. Serial No. 16,788.

*To all whom it may concern:*

Be it known that we, JOHN MEANEY, a subject of the Queen of Great Britain, and JOHN STOEVER, a citizen of the United States, both residents of Ridgefield Park, in the county of Bergen and State of New Jersey, have invented a new and Improved Truck, of which the following is a full, clear, and exact description.

The purpose of this invention is to provide means for preventing a truck from moving backward as the user tilts the load backward on the truck. It is well known that in the use of the usual wheeled hand-trucks the truck is first moved up to the object to be carried and then the object is tilted back upon the truck, after which the truck itself is thrown downward, so as to completely bear the load. When the operator moves the load back on the truck preparatory to throwing the truck down, the truck most invariably will jump or move backward, thus defeating the purpose of the operator. Now it is the intent of our invention to provide an attachment for the truck which will prevent this disadvantageous action.

Reference is to be had to the accompanying drawings, forming a part of this specification, in which similar characters of reference indicate corresponding parts in both views.

Figure 2:
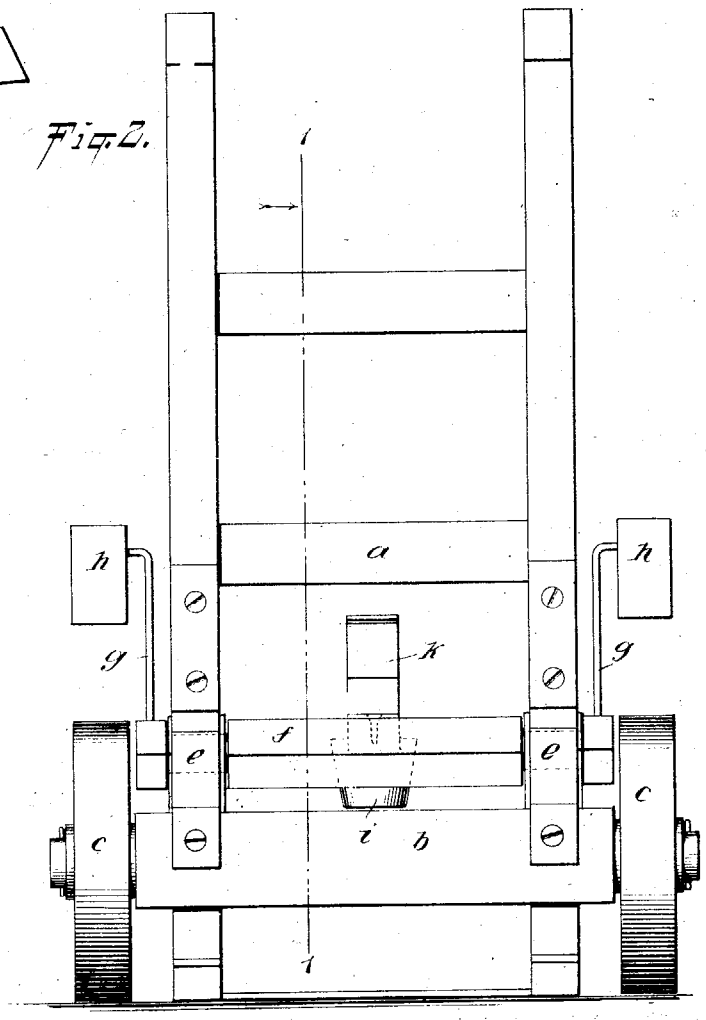
Figure 1:
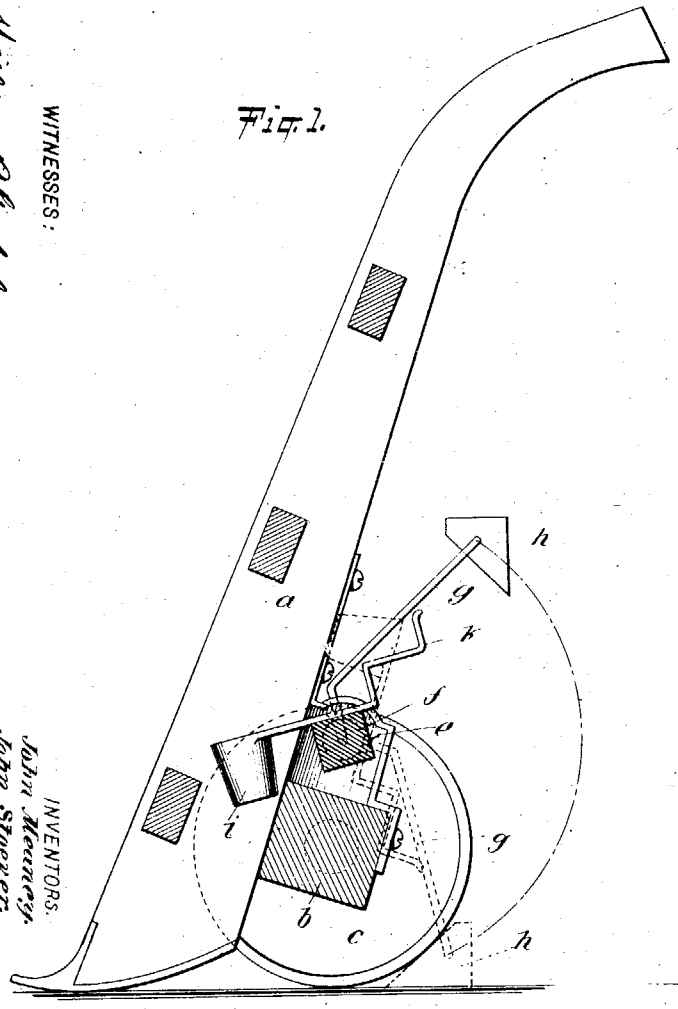

Figure 1 is a sectional elevation of the invention on the line 1 1 of Fig. 2, and Fig. 2 is a rear elevation thereof.

The truck to which our invention is here shown as applied has the usual body *a*, axle *b*, and wheels *c*. Carried at the end portions of the axle *b* are bearings *e*, in which is mounted a rock-shaft *f*. The end portions of the rock-shaft project, respectively, outward beyond the bearings *e*, and each end portion of the rock-shaft carries an arm *g*, on which is mounted a chock *h*, such chocks being respectively in line with the treads of the wheels *c* and being capable of moving downward between the rear portions of the wheels on which the truck is mounted and the ground, as indicated by the dotted lines in Fig. 1, so as to chock the wheels and prevent the backward movement of the truck. The arms *g*, with the attached chocks *h*, are also capable of standing in the upper position shown by full lines in Fig. 1, in which case the chocks will be inactive, and, further, they will be placed well under the truck and out of the way of the person handling the same.

The rock-shaft *f* is provided with a weight *i*, which is attached thereto and situated at one side of the axis of the rock-shaft. When the rock-shaft is thrown, as indicated by full lines in Fig. 1, the weight *i* will extend forward of the rock-shaft and will hold the same in such position, in which case the arms *g* will be raised, so as to hold the chocks *h* inactive. When, however, the rock-shaft *f* is thrown back, so as to move the arms *g* and chocks *h* to the position indicated by dotted lines in Fig. 1, the heft of the weight will be exerted at the opposite or rear side of the rock-shaft and will then serve to hold the shaft in the second position. It will therefore be seen that the rock-shaft may be held in either one of its two possible positions and that when once placed in these positions the rock-shaft will not move out of them except when the weight is overcome by a superior force. For operating the rock-shaft to overcome the weight *i* an arm *k* is attached to the rock-shaft and projects transversely therefrom opposite to the weight. As here shown, the arm *k* forms an integral part of the shank or piece which connects the weight *i* with the rock-shaft.

Having thus described our invention, we claim as new and desire to secure by Letters Patent—

1. In a hand-truck, the combination with the axle and wheels of a rock-shaft mounted on the truck rearward of the axle, a weight carried by the rock-shaft at one side of the axis thereof, the weight moving to each side of the axis of the rock-shaft to hold the rock-shaft in either one of two positions, and a chock carried by the rock-shaft.

2. In a hand-truck, the combination with the wheels and axles thereof, of a rock-shaft mounted rearward of the axle, a wheel-chock carried by the rock-shaft, an arm attached to the rock-shaft and extending transversely thereof, and a weight carried by one end of the arm at one side of the rock-shaft, the other end of the arm forming a means for throwing the rock-shaft to either one of the two positions.

3. In a hand-truck, the combination with the wheels and axle, of a rock-shaft mounted on the truck rearward of the axle, an arm carried by the rock-shaft, a wheel-chock carried by the arm, an arm secured to the rock-shaft and extending transversely thereof, and a weight carried by one end of the arm.

In testimony whereof we have signed our names to this specification in the presence of two subscribing witnesses.

JOHN MEANEY.
JOHN STOEVER.

Witnesses:
FRANK MASON,
MORTIMER P. SHEA.